(12) United States Patent
Watanabe et al.

(10) Patent No.: US 10,192,465 B2
(45) Date of Patent: Jan. 29, 2019

(54) PERITONEAL CAVITY SIMULATOR

(71) Applicant: FASOTEC CO., LTD., Mihama-ku, Chiba-shi, Chiba (JP)

(72) Inventors: Kinichi Watanabe, Chiba (JP); Takeshi Anraku, Chiba (JP)

(73) Assignee: Fasotec Co., Ltd., Chiba (JP)

( * ) Notice: Subject to any disclaimer, the term of this patent is extended or adjusted under 35 U.S.C. 154(b) by 134 days.

(21) Appl. No.: 14/899,369

(22) PCT Filed: Mar. 30, 2015

(86) PCT No.: PCT/JP2015/001843
§ 371 (c)(1),
(2) Date: Dec. 17, 2015

(87) PCT Pub. No.: WO2015/151504
PCT Pub. Date: Oct. 8, 2015

(65) Prior Publication Data
US 2017/0011659 A1 Jan. 12, 2017

(30) Foreign Application Priority Data

Mar. 31, 2014 (JP) ................................ 2014-072651

(51) Int. Cl.
G09B 23/34 (2006.01)
G09B 23/28 (2006.01)
G09B 19/24 (2006.01)

(52) U.S. Cl.
CPC ............. *G09B 23/34* (2013.01); *G09B 19/24* (2013.01); *G09B 23/285* (2013.01)

(58) Field of Classification Search
None
See application file for complete search history.

(56) References Cited

U.S. PATENT DOCUMENTS 5,951,301 A 9/1999 Younker
2012/0082970 A1 4/2012 Pravong et al.

FOREIGN PATENT DOCUMENTS

JP 2010-085512 A 4/2010
JP 3162161 U 8/2010
(Continued)

OTHER PUBLICATIONS

International Search Report, PCT/JP2015/001843, dated Oct. 8, 2015.

*Primary Examiner* — James Hull
(74) *Attorney, Agent, or Firm* — Ogilvie Law Firm

(57) ABSTRACT

Provided is a peritoneal cavity simulator that can simplify the execution of alignment during the replacement of living-body-feeling model organs for repeated trainings on a simulator. This peritoneal cavity simulator comprises: a casing that has a pelvis part, a back part, and an abdomen part; living-body-feeling model organs; and model holding parts. The casing simulates a pelvis and a peritoneal cavity space and comprises at least the pelvis part, which simulates the shape of a human body, the back part, which has left and right flank parts, and the abdomen part, which is provided with a plurality of ports into which can be inserted a surgical instrument that is used in peritoneal cavity microscopic surgery. The model holding part is a holding part that is attached to the back part or the pelvis part, and fixes, mounts, or sandwiches and holds the living-body-feeling model organs inside the peritoneal cavity space.

16 Claims, 13 Drawing Sheets

(56) References Cited

FOREIGN PATENT DOCUMENTS

| | | |
|---|---|---|
| JP | 2011-113056 A | 6/2011 |
| JP | 3177527 U | 8/2012 |
| JP | 2013-109030 A | 6/2013 |
| JP | 3184695 U | 7/2013 |
| JP | 2013-235040 A | 11/2013 |
| JP | 2013-544373 A | 12/2013 |

(1)

(2)

(3)

(4)

(1)

(2)

PERITONEAL CAVITY SIMULATOR

TECHNICAL FIELD

This invention relates to a peritoneal cavity simulator for training and learning of a laparoscopic surgery.

BACKGROUND ART

Recent years, DAVINCHI (a registered trademark), a medical robot for a master-slave type endoscopic procedure developed by the US Intuitive Surgical Corporation is known. In order to improve an operation skill of such a medical robot, equipment simulating a peritoneal cavity and a pelvis exists, conventionally. In a casing of such equipment, a port for inserting forceps and apparatuses of medical robots mentioned above are disposed and a training of laparoscopic procedure is performed on intraperitoneal organs such as a urinary bladder housed within a casing.

A percutaneous procedure simulator that enables learning of an advanced procedure, even without having any clinical experiences, through training sensuously similar to an actual medical procedure is already known regarding medical procedures in medical fields such as dissection or skin stitching. (Refer to patent literature 1, for example) The percutaneous procedure simulator disclosed in patent literature 1 includes a main body having a curved surface in a convex shape, a mounting part for mounting a trachea (a substitute for a human internal organ), a skin fixing part for fixing skin (a substitute for human skin) at a main body in such a way that the skin covers a part of the trachea and a fixing part displacement mechanism for advancing and retreating the fixing part in the direction vertical to the curved surface. By using this percutaneous procedure simulator, a configuration wherein a skin covers a trachea is realized similarly as the configuration of a human body wherein a skin covers organs. Also, the curved surface becomes a substitute for the human body surface. By approximating the shape, the configuration, the hardness and the texture of the surface and the inner part of substitute to those of the human body, a simulation similar to an actual medical procedure can be conducted.

Also, a portable training device for medical operations having an artificial body cavity for disposing internal body models substantially hidden from the user's visual field formed is known. (Refer to patent literature 2, for example) In the portable training device for medical operations disclosed in patent literature 2, a base and an upper cover are disposed via a leg with a space, forming an artificial body cavity, and a detachable insert material simulating human tissue is disposed.

However, there is such a problem as a case wherein it is hard to say, for example, that a pelvis structure, a urine duct and a urinary bladder are reproduced with reality as a medical procedure simulator for training of suturing a urinary bladder area with a urine duct, and a trouble of positioning at the time of exchanging an insert material simulating a human tissue to conduct repeated trainings is not eased.

PRIOR ART

Patent Literature

[Patent literature 1] JP 2010-085512 A
[Patent literature 2] JP 2013-544373 A

OUTLINE OF THE INVENTION

Problems to be Solved by the Invention

In a case of conducting a training of endoscopic procedures using the above mentioned medical robot, a plurality of forceps and surgical instruments are inserted from a plurality of ports, at one time. There is such a problem that the exchange of intraperitoneal organs such as a urinary bladder area stored inside a casing cannot be conducted easily because extraction/insertion of forceps and surgical instruments takes a time once they are inserted.

Also, as an equipment for training the suturing of a urinary bladder area with a urinal duct, an equipment that can reproduce a pelvis structure, a urinal duct and a urinary bladder all with reality and also can alleviate the trouble of positioning at the time of exchange of an insert material simulating a human tissue for conducting repeated trainings is desired.

In view of such a situation, the present invention aims to provide a peritoneal cavity simulator that can conduct positioning easily at the time of exchange of a biologically textured organ model for the purpose of repeated trainings in using a medical procedure simulator for conducting a training of a laparoscopic procedure.

Means to Solve the Objects

In order to resolve the problem mentioned above, the peritoneal cavity simulator according to the present invention is configured with a casing, at least one biologically textured organ model and a model gripping portion in the peritoneal cavity simulator for acquiring laparoscopic procedures.

The casing constitutes of at least a pelvis area simulating a human body shape, a back area possessing left and right sides of the abdomen and an abdomen area furnished with plurality of ports through which surgical instruments to be used under a laparoscopic procedure can be inserted, and this casing simulates a peritoneal cavity space and a pelvis.

The model gripping portion is a gripping portion disposed in a back area or a pelvis area, and fixes, mounts or clips a biologically textured organ model inside the peritoneal cavity.

The biologically textured organ model improves the reality feeling by employing a soft raw material approximating the actual texture, and achieves acquirement of an actual procedure. Three-dimensional shape data is created by using DICOM (Digital Imaging and Communications in Medicine) data obtained from medical diagnosis devices such as an X-ray CT and MRI (Magnetic Resonance Imaging), which is used as a basis for making 3 dimensional molding models that are modeled objects of three dimensional living-body internal organs having textures (visualization, feel, hardness, softness and so on) of each part of human body (bone, internal organ and so on). The production methods of biologically textured organ models are published in the international patent (laid open) (WO2012/132463) pamphlet, for example.

The model gripping portion of the peritoneal cavity simulator according to the present invention is slide free against protruded parts simulating a spine disposed at an inner wall of the casing in the back area and has mounting means for mounting the biologically textured organ model. When the peritoneal cavity simulator is used, the casing of the back area is set at a lower position and the casing of the abdomen is set at an upper position. Because the inner wall of the casing of the back area is furnished with protruded parts simulating a spine, a recess that fits into the spine is disposed at the bottom surface of the model gripping portion. And the upper surface of the model gripping portion is made to form a plate on which the biologically textured organ models can be mounted. Or, a recess is set up so that the biologically textured organ models can be stably mounted on the upper surface of the model gripping portion.

The model gripping portion of the peritoneal cavity simulator according to the present invention is slide free against protruded parts simulating a spine disposed at an inner wall of the casing in the back area has a clipping for clipping the biologically textured organ models. The biologically textured organ models are clipped by the clipping means and disposed in the peritoneal space.

The model gripping portion of the peritoneal cavity simulator according to the present invention is a rod like member which is attached to the inner wall of the casing in the pelvis area, the back area or the left and right sides of abdomen, and the biologically textured organ model is fixed to or engaged with the end part of this rod like member. Here, the rod like member is attached to the inner wall of the casing by screwing or engagement. By thrusting the end portion of the rod like member into the biologically textured organ model, the biologically textured organ model can be fixed. Or, it is also acceptable that, the end part of the rod like member is to have a hook, and the hook and the biologically textured organ model are engaged to each other.

The model gripping portion of the peritoneal cavity simulator according to the present invention is a strip member abutting against the inner wall of the pelvis casing and the urinary bladder as the biologically textured organ model can be put in to or out from the peritoneal cavity space.

The urinary bladder model and the urethra connected thereto employ a soft raw material approximated to the actual texture to improve the reality feeling, which leads to a practical procedure learning. By the casing for simulating an abdomen and a pelvis, an operation training of medical instruments such as forceps in a narrow space can be performed. Also, more practical medical procedure learning becomes possible by the inner shape of the casing with not only a pelvis but also pubic bones simulated.

If forceps and surgical instruments were inserted from plurality of ports all at once, the extraction/insertion of forceps and surgical instruments becomes time consuming. For this reason, the urinary bladder model is exchanged by putting in and out a strip member in a state wherein forceps and surgical instruments are being pushed in. Note that the strip member can be a rod like member as long as it can be stably abutted against the inner wall of the casing.

In the peritoneal cavity simulator according to the present invention, it is preferable that a mapping of a living body image is performed. By mapping a living body image on the inner wall of the casing, training can be performed with more realistic video images when a monitor camera is inserted from the port.

In the peritoneal cavity simulator according to the present invention, the biologically textured organ model preferably reproduces a three-dimensional structure inside the organs. By reproducing the three-dimensional structure inside the organs, training with more reality can be conducted at the time of excision operation in the medical procedure training.

In the peritoneal cavity simulator according to the present invention, the biologically textured organ model is preferably furnished with means for enabling compression/expansion and changing the model size. With model size changeability of the biologically textured organ model, medical procedures on models with motion such as an intestine and a stomach can be trained.

In the peritoneal cavity simulator according to the present invention, it is preferable that a tube for simulating a blood vessel is disposed at the model surface or vicinity of the model and means for outflowing liquid is disposed for the occasion of said tube fracturing. A case wherein bleeding occurs during an operation can be simulated and the handling method in such cases can be trained.

The peritoneal cavity simulator according to the present invention has the ability to change its number of ports and their positions by exchanging the casing of the abdomen. Due to this changeability of the number of ports and the port positions, it becomes possible to increase the freedom of insert position of the medical instruments such as forceps, and subsequently suturing trainings of various medical procedures can be performed.

The peritoneal cavity simulator according to the present invention is configured with a casing, at least one biologically textured organ model and a model gripping portion in the peritoneal cavity simulator for acquiring a laparoscopic medical procedure.

The casing is configured at least with a pelvic area simulating a human body shape and an abdomen area furnished with a plurality of ports with ability to insert surgical instruments used in a laparoscopic procedure, to simulate a peritoneal cavity space and a pelvic area.

The model gripping portion, being a gripping portion to be attached to the pelvic area, fixes, mounts or grips the biologically textured organ model inside the peritoneal cavity space. Here, the model gripping portion is a stripping member abutting against the inner wall of the casing of the pelvic area and the urinary bladder model as a biologically textured organ model can be inserted into/extracted from the peritoneal cavity space.

Within the urinary bladder model in the peritoneal cavity simulator according to the present invention, a plurality of holes for suturing with a urine duct are disposed at the peripheral edge and an engaging portion engageable with the urinary bladder model is disposed at the end portion of a stripping member. This engageable portion has a polygonal structure and a hole to be sutured with a urine duct can be exchanged by changing the engaging position between the urinary bladder model and the engaging portion. By matching the shape of the engaging portion and the shape of the inner wall of the urinary bladder model, the urinary bladder model can be easily engaged with the engaging portion. Also, the suturing training for the urinary bladder model and the urine duct can be performed without an influence after suturing by the former suturing training, by changing the position for the urinary bladder to be engaged with the engaging portion, and also by applying a new urine duct by cutting the tip of the urine duct.

Here, a soft raw material which enables processing and adjustment of the length by scissors and cutters are used in the aim that the length of the urine duct can be adjusted by cutting the length according to the customers' choice.

Also, in the peritoneal cavity simulator according to the present invention, it is preferable that the number of holes in the urinary bladder model is N if the engaging portion is in the shape of N-polygonal (N is equal to or larger than 3), and each hole is disposed at each pinnacle of N-polygonal. By making the engaging portion N-polygonal and letting holes of the urinary bladder exist at each pinnacle of the N-polygonal, the mounting position of the urinary bladder model and the engaging portion can be changed every time the suturing training for the urinary bladder and the tip of the urine duct is repeated, and resultantly the suturing training can be conducted under no after-suturing state.

Also, in the peritoneal cavity simulator according to the present invention, it is preferable that a guide with capability of fixing the urinary bladder model and the strip member is disposed in such a way that the tip portion of the urine duct and the hole of the urinary bladder are abutted to each other in a case wherein a urine duct gripping portion for gripping the urine duct is disposed and the urine duct gripping portion is inserted into the equipment main body.

Here, the guide is a recess portion disposed at the inner wall of the casing of the peritoneal cavity simulator and the strip member is fitted and fixed to the recess portion.

Effects of the Invention

According to the peritoneal cavity simulator according to the present invention, positioning of the biologically textured organ model at the time of its exchange for repeated trainings can be performed easily. Also, in the suturing training of the urinary bladder model and the urine duct, positioning of the insert material simulating the urinary bladder model can be performed easily at the time of exchange for repeated trainings.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Embodiment 1

The peritoneal cavity simulator according to embodiment 1 is explained by referencing FIG. 1 to FIG. 12.

Figure 1:
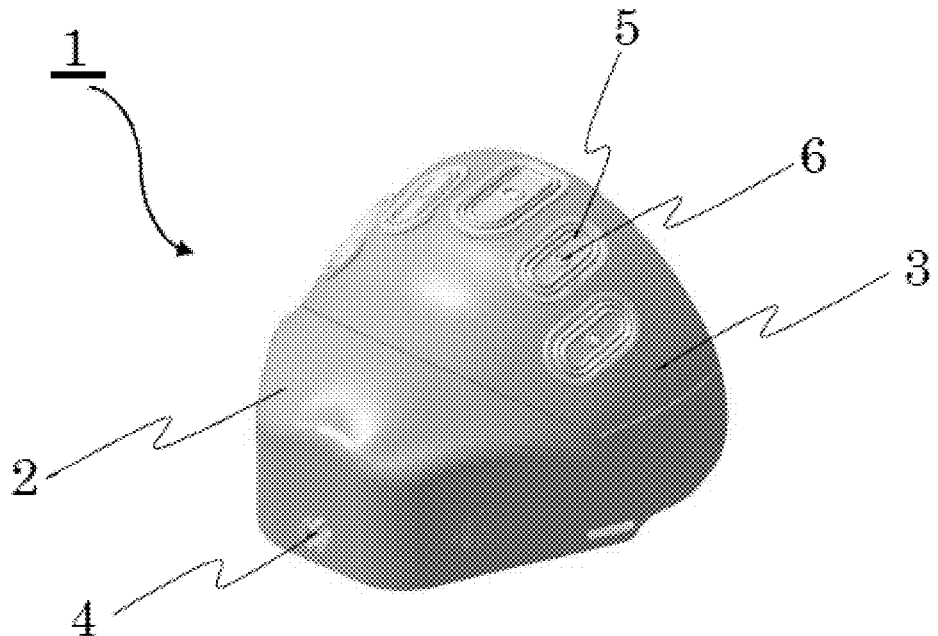
FIG. 1 An external view of the peritoneal cavity simulator according to embodiment 1
Figure 2:
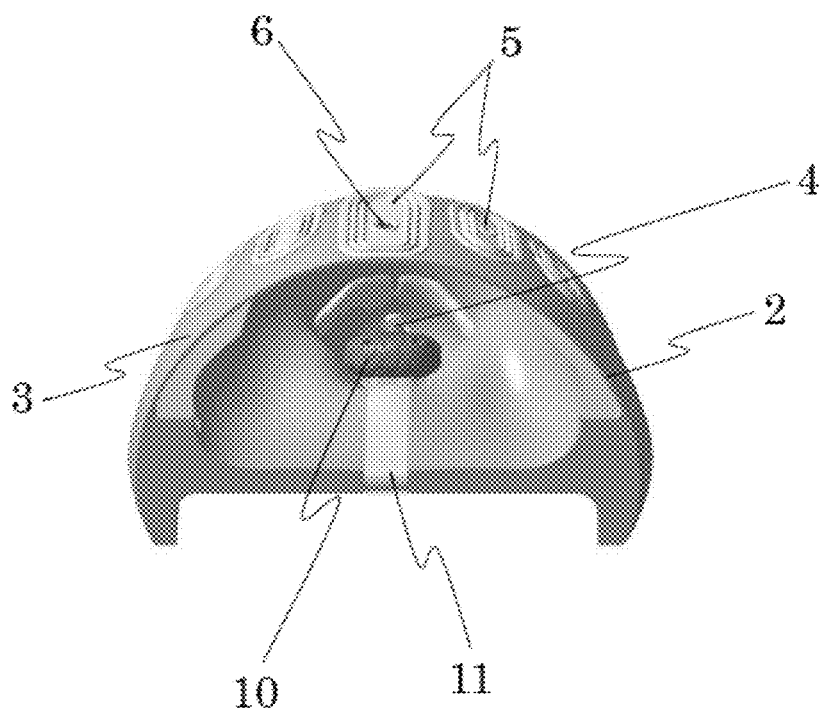
FIG. 2 An external view of the peritoneal cavity simulator according to embodiment 1 (opening side)

As shown in FIG. 1, the peritoneal cavity simulator 1 is equipment for training of suturing the urinary bladder model 10 and the urine duct 4 shown in FIG. 2, furnished with a casing 2 simulating a peritoneal cavity and a pelvis in the laparoscopic medical procedure. The casing 2 simulating the peritoneal cavity and the pelvis simulates the lower region of peritoneal cavity site, and the diaphragm side of the peritoneal cavity space is opened as is shown in FIG. 2.

Figure 3:
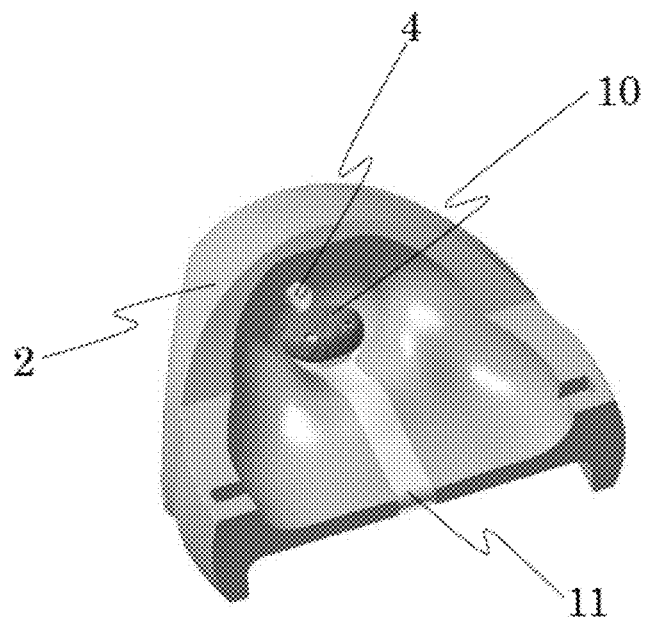
FIG. 3 An external view of the cover of the peritoneal cavity simulator after removing according to embodiment 1
Figure 4:
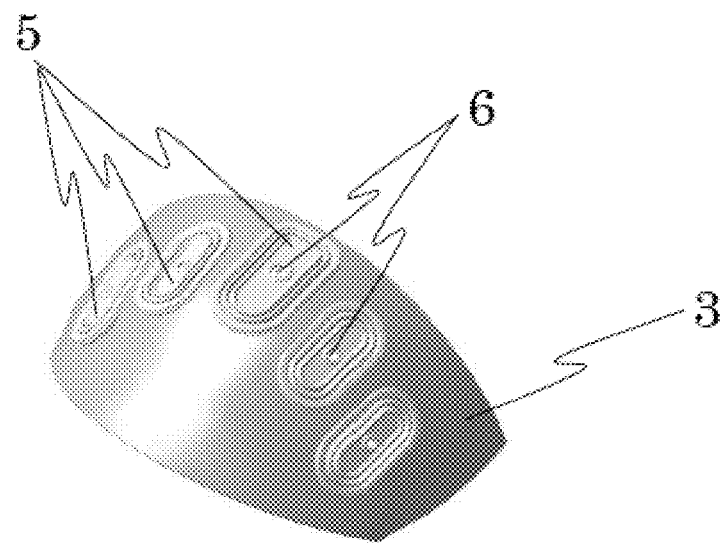
FIG. 4 An external view of the cover of the peritoneal cavity simulator according to embodiment 1
Figure 5:
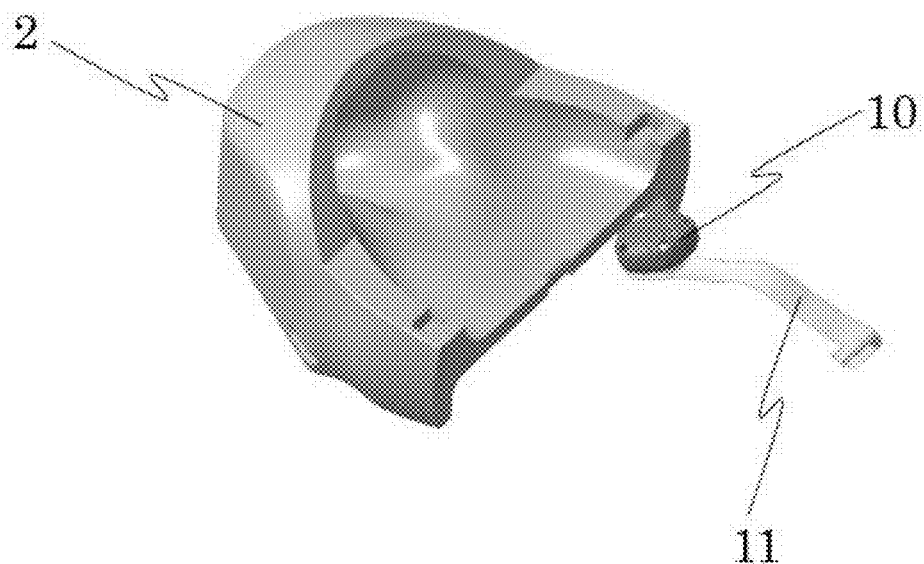
FIG. 5 An image of the urinary bladder model and the strip member after removing FIG. 6 An external view of the urinary bladder model and the strip member FIG. 7 A plan view of the urinary bladder model and the strip member FIG. 8 A structural view of the engagement portion and the strip member FIG. 9 An explanatory view 1 of installation for the urine duct FIG. 10 An explanatory view 2 of installation for the urine duct FIG. 11 An explanatory view 3 of installation for the urine duct FIG. 12 An explanatory view for use of the peritoneal cavity simulator according to embodiment 1

As is shown in FIG. 3, the cover 3 is detachable from the peritoneal cavity simulator 1. The cover 3 is furnished with a plurality of through holes (5 holes in the figure) as is shown in FIG. 4, and the port members 5 are attached to these through holes. The port member 5 has a port hole 6, and forceps and surgical instruments can be inserted into inside the peritoneal cavity space through the port hole 6.

Also, as are shown in FIG. 2 and FIG. 3, a urinary bladder model 10 is disposed detachably to the inside of the peritoneal cavity simulator 1. A strip member 11 is disposed in the urinary bladder model 10 and the urinary bladder model 10 can be extracted from the peritoneal cavity space in the peritoneal cavity simulator 1 by using the strip member 11.

Figure 6:
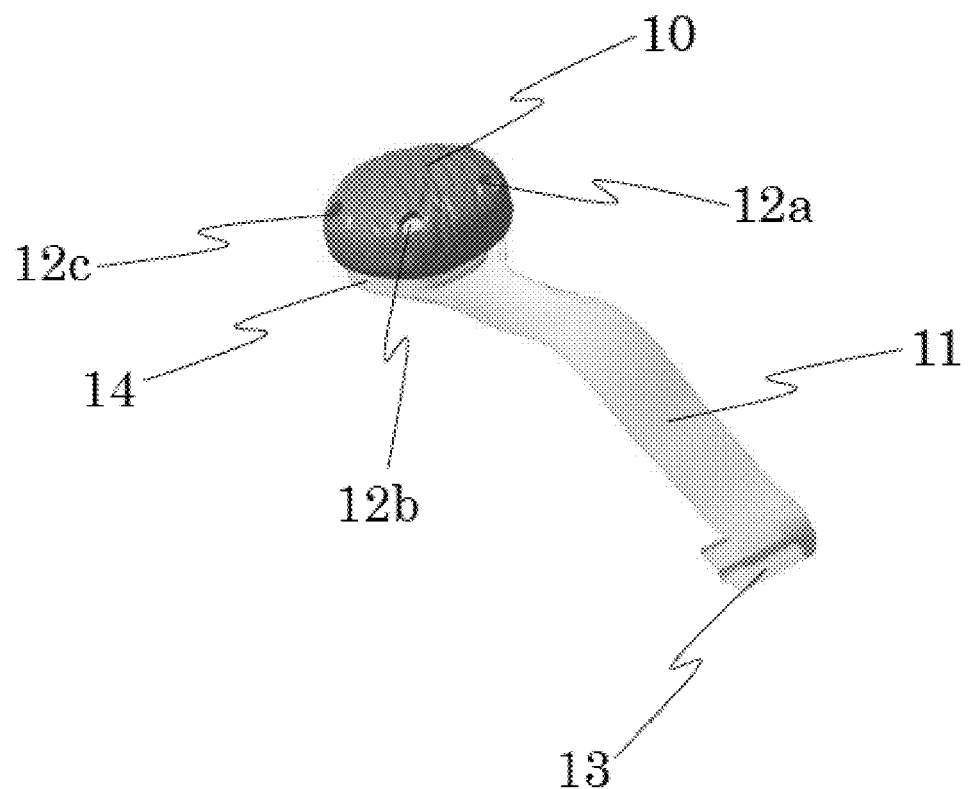
Figure 7:
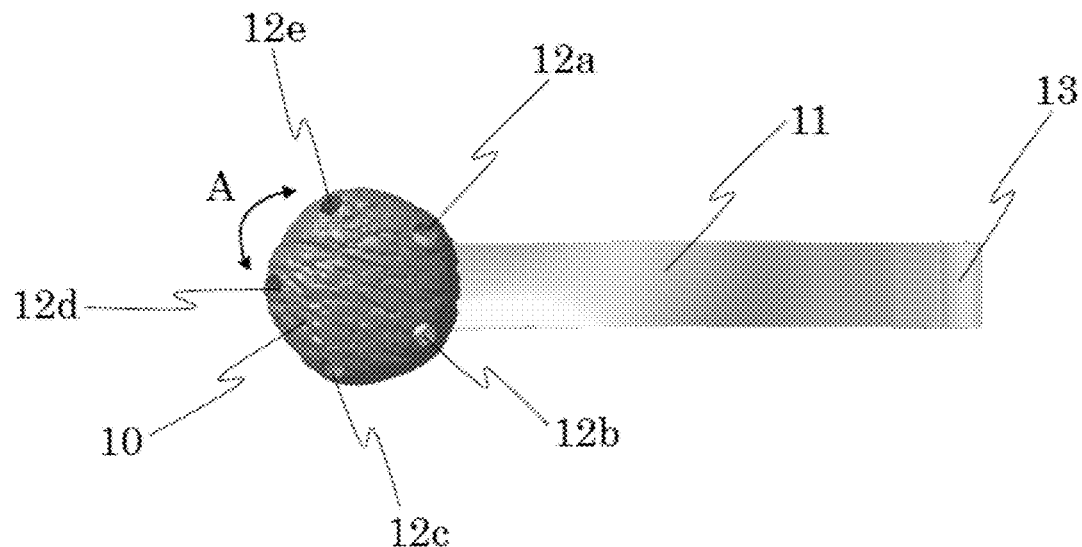
Figure 8:
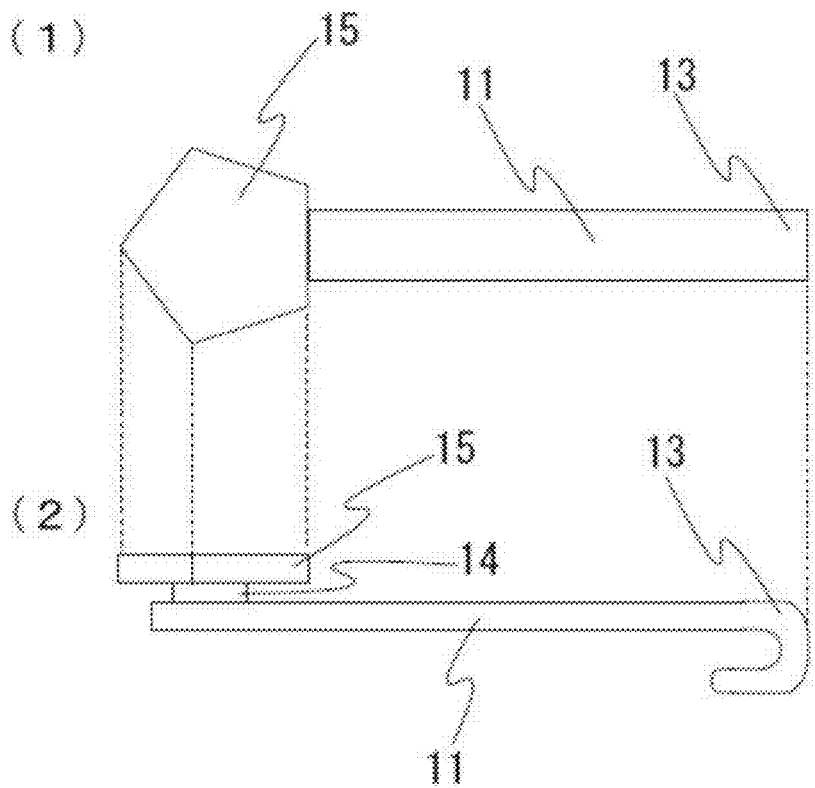

The urinary bladder model 10 and the strip member 11 are explained by referencing FIG. 6 to FIG. 8.

As is shown in FIG. 6, the strip member 11 is extended from a support portion 14 for supporting under the urinary bladder model 10. The strip member 11 is moderately curved along the inner wall of the peritoneal cavity simulator 1 and a hook portion 13 is disposed at the tip portion. As is shown in FIG. 3, the edge of the casing 2 in the peritoneal cavity simulator 1 and by strip member 11 are engaged by the hook portion 13.

The urinary bladder model 10 has holes (12a to 12e) disposed at the peripheral edge thereof, as shown in FIG. 7.

As is shown in FIG. 8, an engagement portion 15 is formed at the strip member 11 on the edge portion opposite the hook portion 13. The engagement portion 15 has a pentagonal shape and the urinary bladder model 10 covers this engagement portion 15. The urinary bladder model 10 is made of elastic resin such as synthesized rubber, possessing expendability and elasticity. The inner wall of the urinary bladder model 10 and the engagement portion are made to be of the same shape so that 5 holes (12a to 12e) of the urinary bladder model 10 are disposed at the pinnacle positions of the pentagonal shape.

Figure 9:
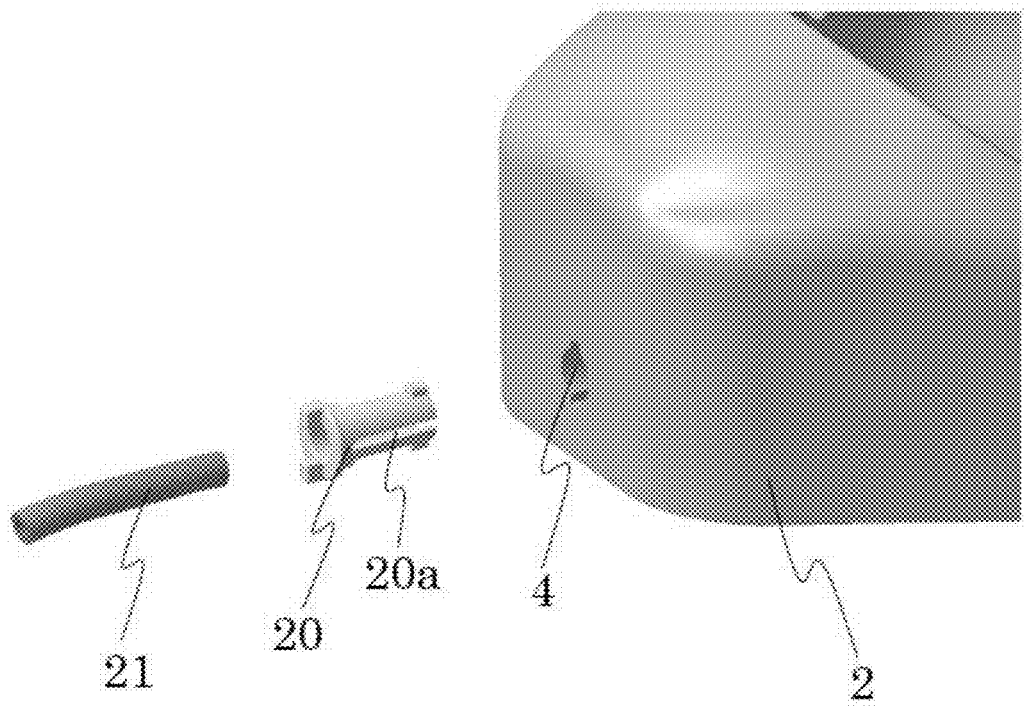
Figure 10:
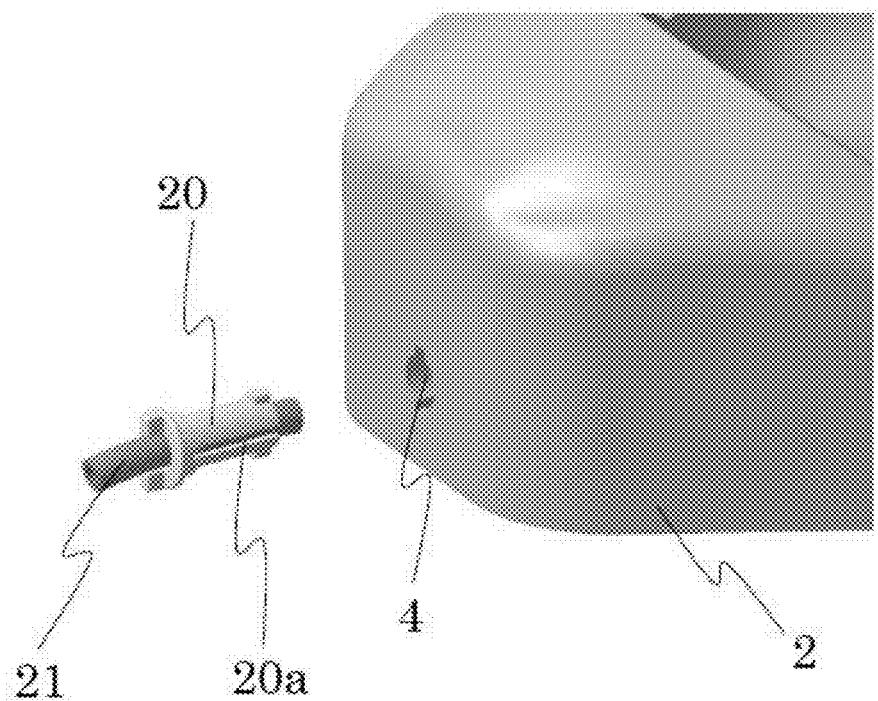
Figure 11:
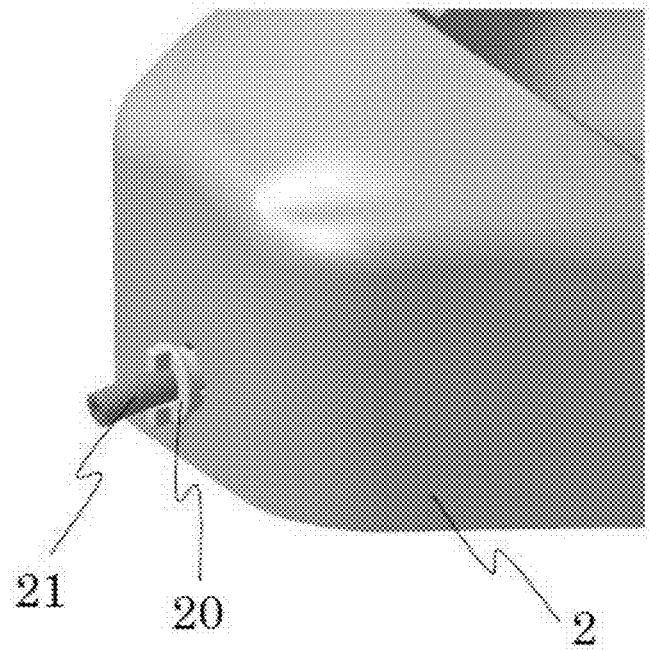

Next, a method to install the urine duct to the casing 2 of the peritoneal cavity simulator 1 is explained by referencing FIG. 9 to FIG. 11. The urine duct member 21 for simulating a urine duct is made of elastic resin such as synthesized rubber possessing expendability and elasticity. As are shown in FIG. 9 and FIG. 10, this urine duct member 21 is inserted through the inside of the urine duct gripping portion 20 made of the hard resin. A plurality of notches 20a is formed in the longitudinal direction of the urine duct gripping portion 20. As is shown in FIG. 11, the urine duct gipping portion 20, namely the urine duct member 21 is fixed to the hole 4 of the urine duct by the work of the notch portion 20a when the urine duct gripping portion 20 is pushed into the hole 4 of the urine duct at the casing 2.

Figure 12:
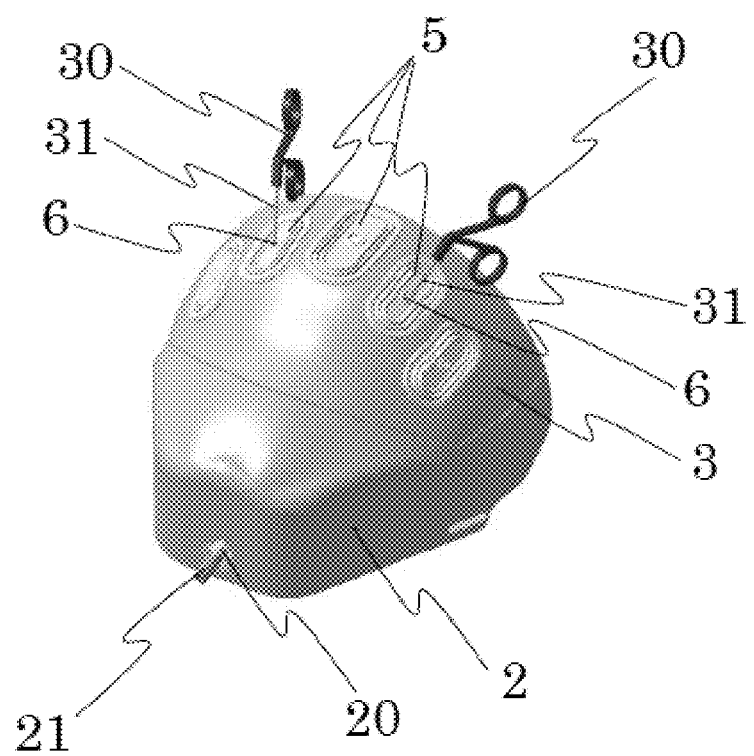

FIG. 12 shows an image of the peritoneal cavity simulator operation. The image shows that 5 port members 5 are disposed at the cover 3, 2 forceps 31 are inserted therein, and the surgical instruments under the laparoscopy are operated by 2 forceps handles 30.

Embodiment 2

Figure 13:
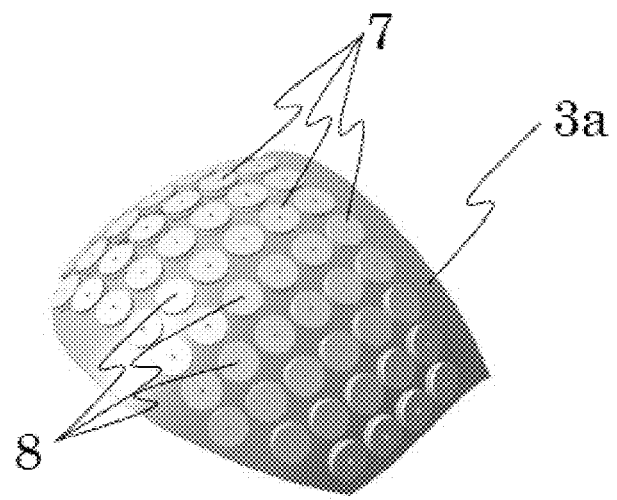
FIG. 13 An external view of the cover of the peritoneal cavity simulator according to embodiment 2
Figure 14:
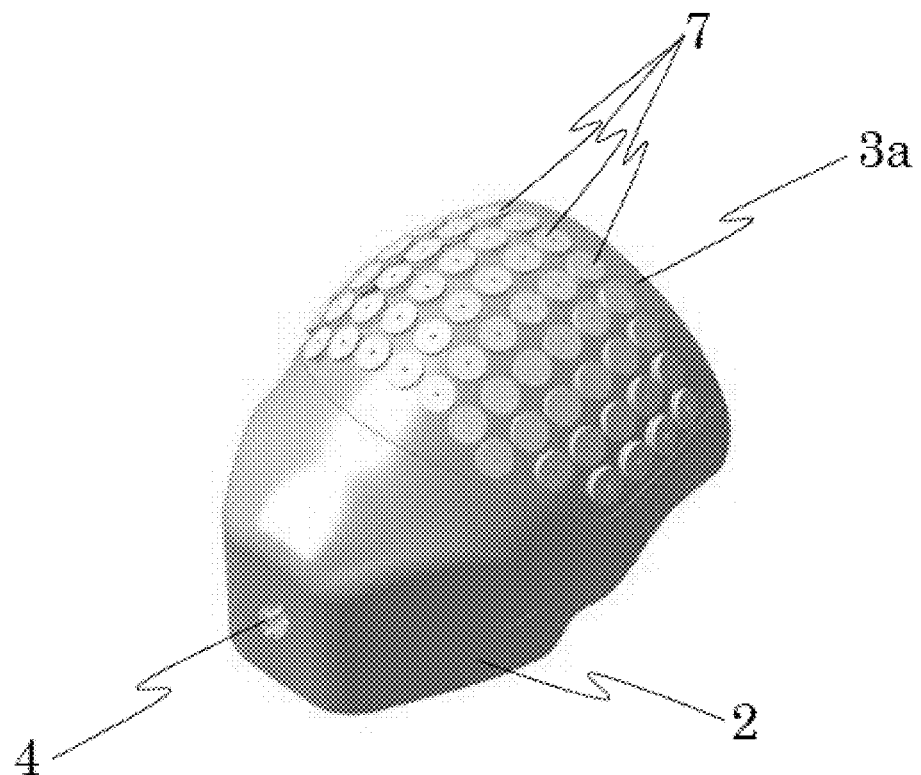
FIG. 14 An external view of the peritoneal cavity simulator according to embodiment 2
Figure 15:
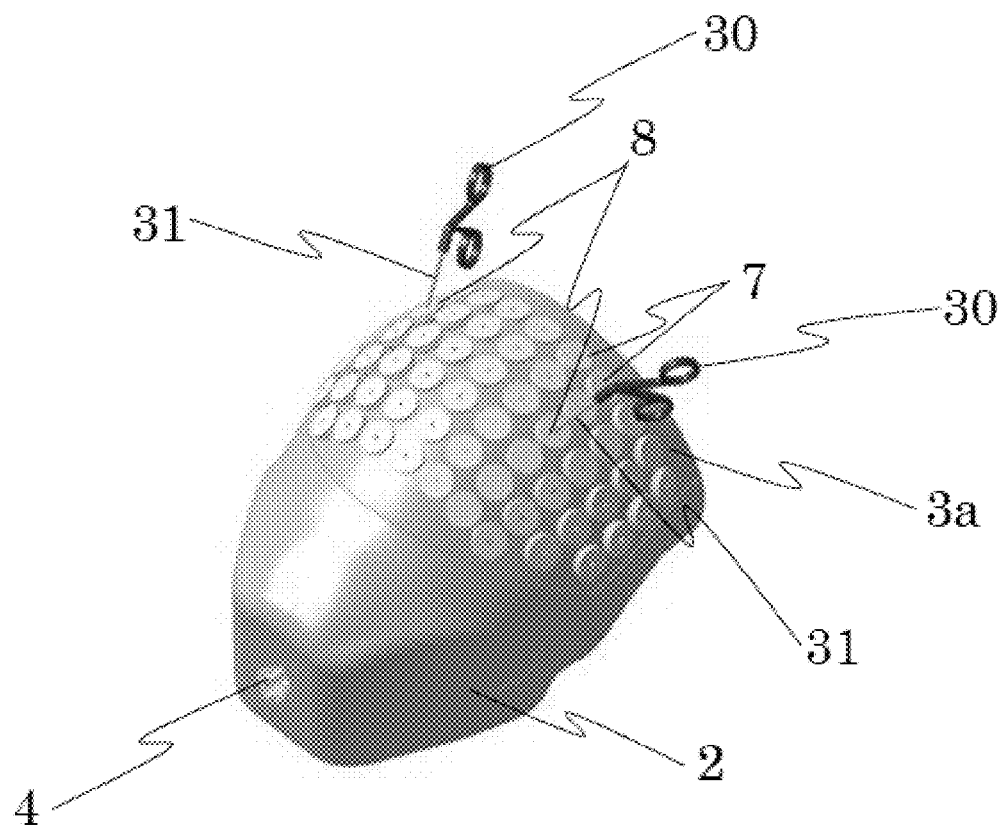
FIG. 15 An explanatory view for use of the peritoneal cavity simulator according to embodiment 2

The cover in peritoneal cavity simulator according to embodiment 2 is explained by referencing FIG. 13 to FIG. 15.

In the cover of the peritoneal cavity simulator according to embodiment 2, the size of the port member 7 is smaller and the number of arrangement is larger as shown in FIG. 13 and FIG. 14, compared with the cover in the case of the peritoneal cavity simulator according to embodiment 1. The port holes 8 are arranged over the entire cover area and the freedom of insert position for the forceps 31 can be improved as shown in FIG. 15.

Embodiment 3

Figure 16:
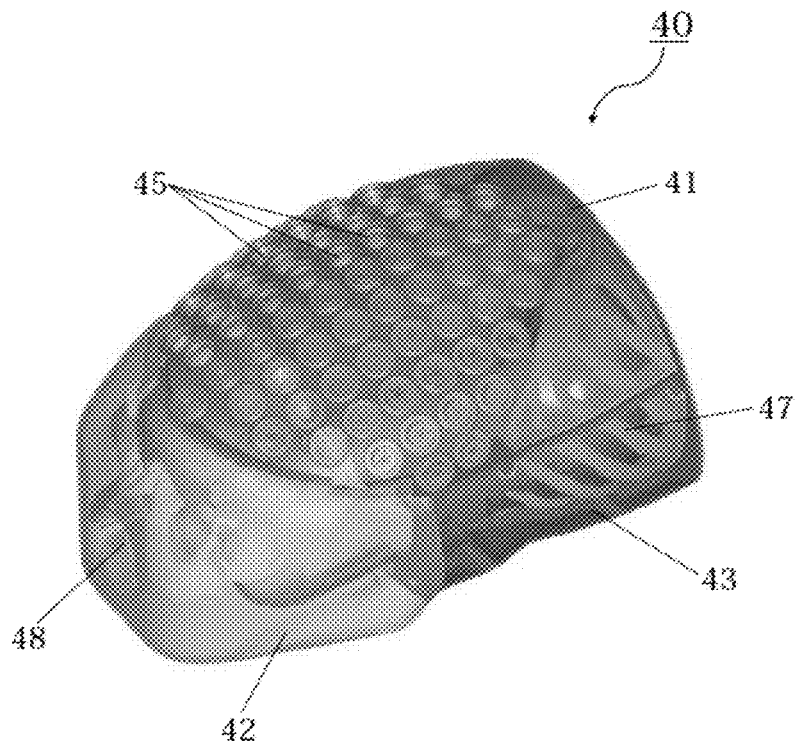
FIG. 16 An external perspective view of the peritoneal cavity simulator according to embodiment 3
Figure 17:
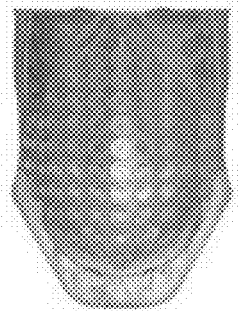
FIG. 17 An external view of the peritoneal cavity simulator according to embodiment 3
Figure 17:
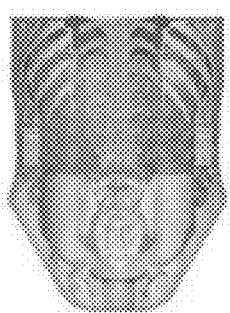
Figure 17:
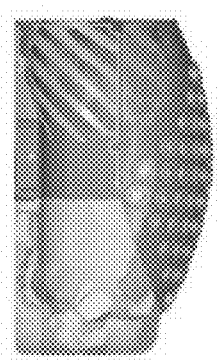
Figure 17:
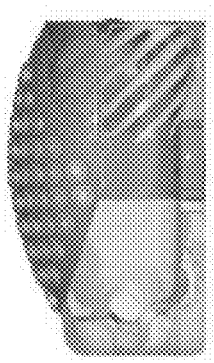

The peritoneal cavity simulator according to embodiment 3 is explained by referencing FIG. 16 to FIG. 20. FIG. 17 (1) shows a front view of the peritoneal cavity simulator, (2) shows a back view, (3) shows a left side view and (4) shows a right side view. In the peritoneal cavity simulator according to embodiment 3, the shape of the casing is similar to the shape of the space that includes the abdomen and the pelvis, as shown in FIG. 16 and FIG. 17. Also, the casing itself consists of a translucent material and the state of the peritoneal cavity space which is the space inside the casing can be observed. The casing of the peritoneal cavity simulator 40 consists of the casing member of the abdomen 41, the casing member of the pelvis, the casing member of the back area 43 and the lid to be described later. A large number of port holes 45 are formed at the abdomen area 41. Forceps and surgical instruments can be inserted into the inside of the peritoneal cavity space through the port hole 45 in an arbitrary position. A simulated structure of the ribs 47 is disposed at the back area 43 of the left and right sides of the abdomen. Also, a hole 48 of the urine duct is disposed at the casing member of the pelvis 42.

Figure 18:
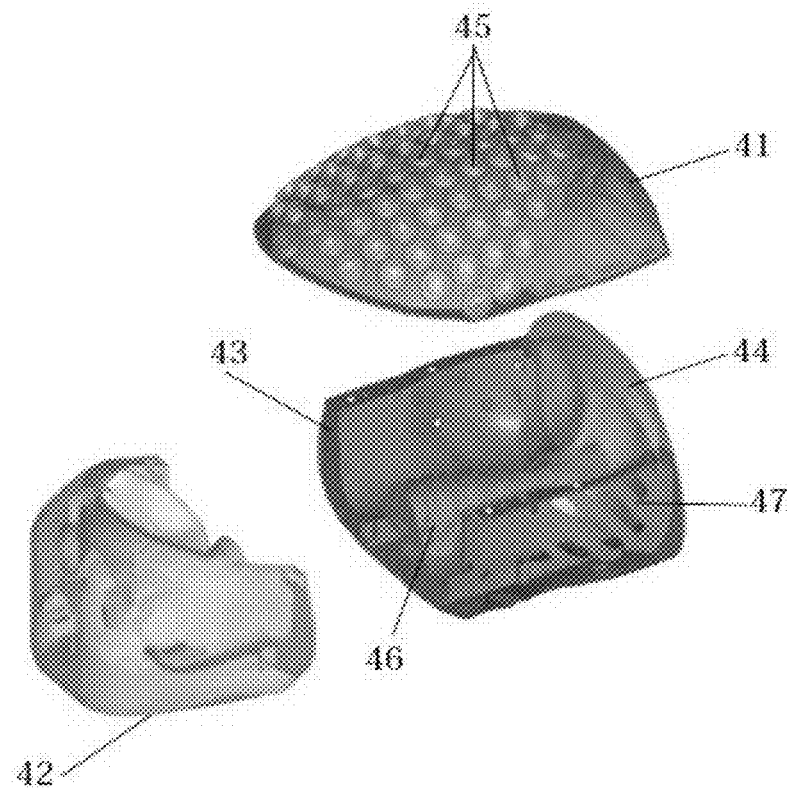
FIG. 18 An exploded view (1) of the peritoneal cavity simulator according to embodiment 3
Figure 19:
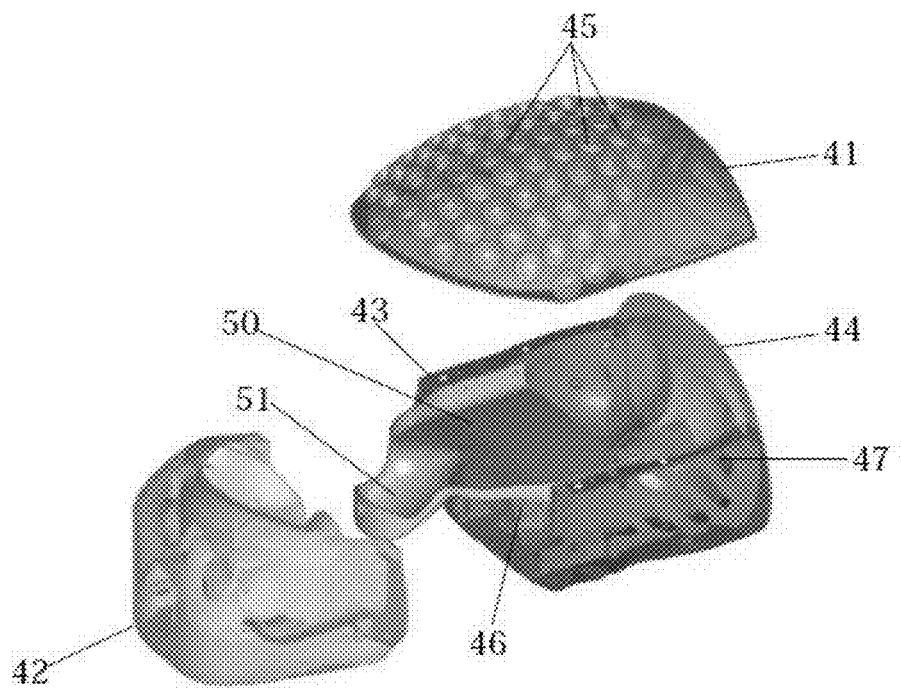
FIG. 19 An exploded view (2) of the peritoneal cavity simulator according to embodiment 3
Figure 20:
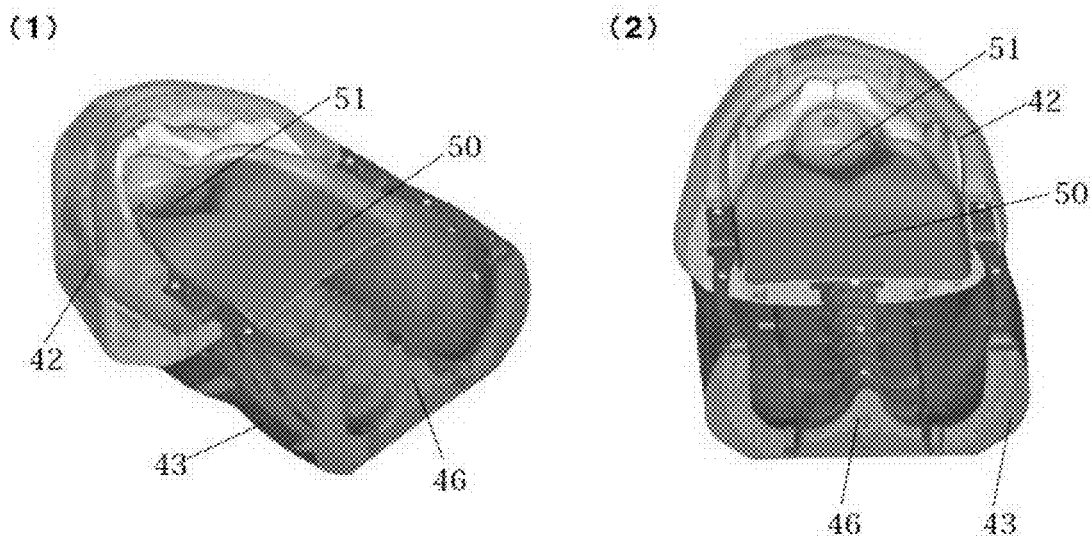
FIG. 20 An explanatory view of the model gripping portion

FIG. 18 and FIG. 19 show an exploded illustration diagram of the present peritoneal cavity simulator. The present peritoneal cavity simulator consists of an abdomen 41, a pelvis 42, a back 43 and a lid 44. The lid 44 is a lid member for simulating a diaphragm and for closing the opening of the peritoneal cavity simulator. As is shown in FIG. 19, the model gripping portion 50 to be fitted to a protruded article in the spine 46 disposed at the inner wall of the back area 43 is disposed toward the inside of the peritoneal cavity space and the biologically textured organ model can be placed at the plate-shaped section in the upper surface. Also, the model gripping portion 50 can store the urinary bladder model in the recession 51 extensively attached to the side of the pelvis 42. As is shown in FIGS. 20 (1) and (2), the plate-shaped section is extended to ½ of the peritoneal cavity space, and this plate-shaped section can be further extended. Also, there is a recess at a part of the plate-shaped portion and the biologically textured organ model may be disposed at the recess.

Embodiment 4

Figure 21:
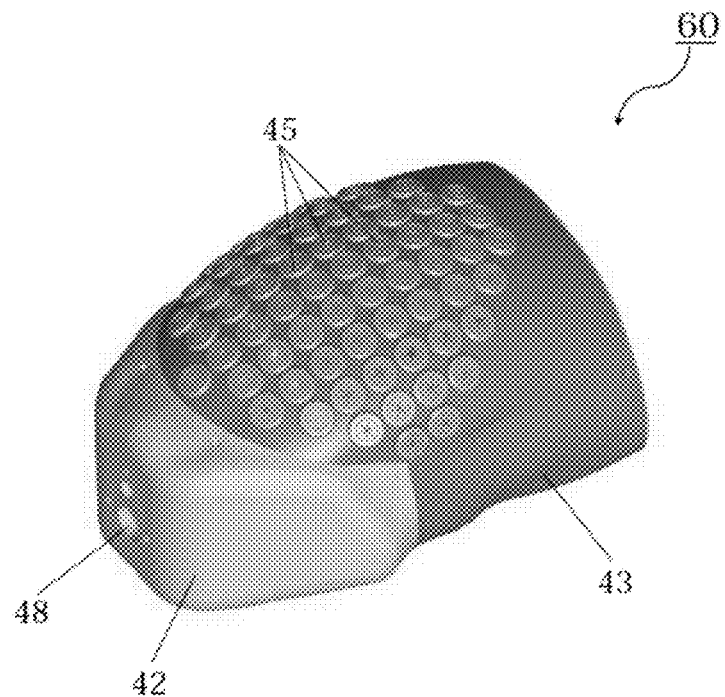
FIG. 21 An external perspective view of the peritoneal cavity simulator according to embodiment 4
Figure 22:
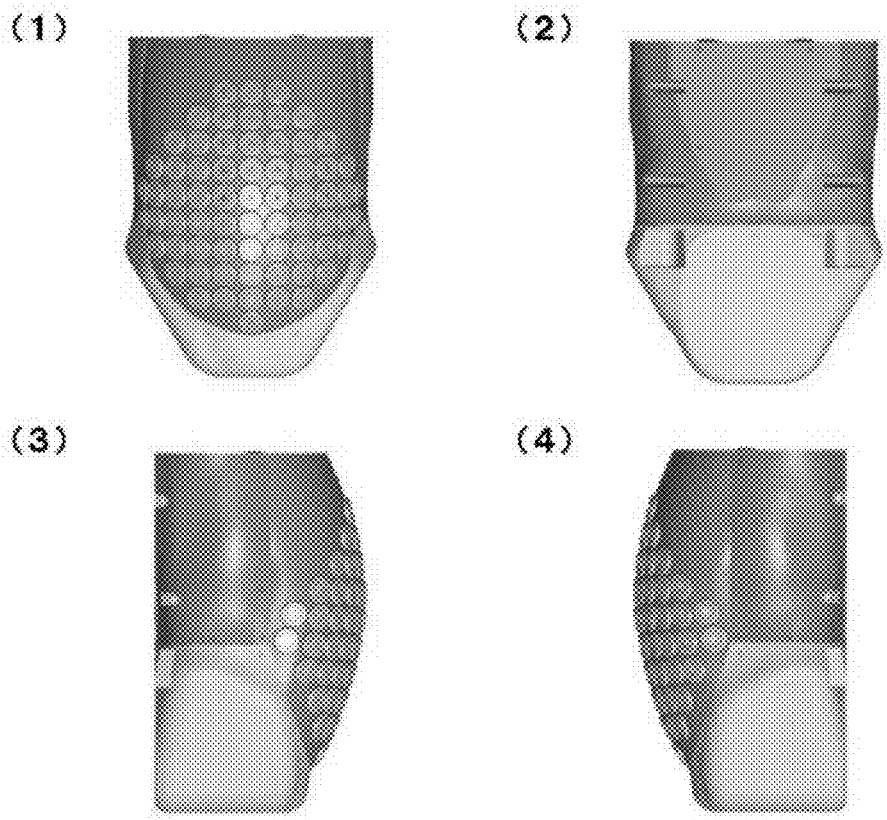
FIG. 22 An external view of the peritoneal cavity simulator according to embodiment 4

The peritoneal cavity simulator according to embodiment 4 is explained by referencing FIG. 21 to FIG. 24. FIG. 22 (1) shows a front view of the peritoneal cavity simulator, (2) shows a back view, (3) shows a left side view and (4) shows a right side view. The peritoneal cavity simulator according to embodiment 4, unlike the peritoneal cavity simulator according to embodiment 3, the casing is made by an opaque material not to reveal the inside of the casing.

In the peritoneal cavity simulator according to embodiment 4, similarly as the peritoneal cavity simulator according to embodiment 3, the shape of the casing is similar to the shape of the space that includes the abdomen and the pelvis, as shown in FIG. 21 and FIG. 22. Also, the casing itself is made of an opaque material and the state inside the peritoneal cavity space that is the space inside the casing cannot be observed, consequently. This leads to an arrangement wherein the observation of the peritoneal cavity space is performed through a camera lens in a similar manner as the actual laparoscopic medical procedure. The casing of the peritoneal cavity simulator 60 is configured with the casing member of the abdomen 41, the casing member of the pelvis 4, the casing member of the back area 43 and the lid area 44 which will be described later. Many port holes 45 are formed at the abdomen 41. A camera lens is inserted into the inside the peritoneal cavity space through a port hole 45 at an arbitrary position. The hole 48 for the urine duct is disposed at the casing member of the pelvis 42.

Figure 23:
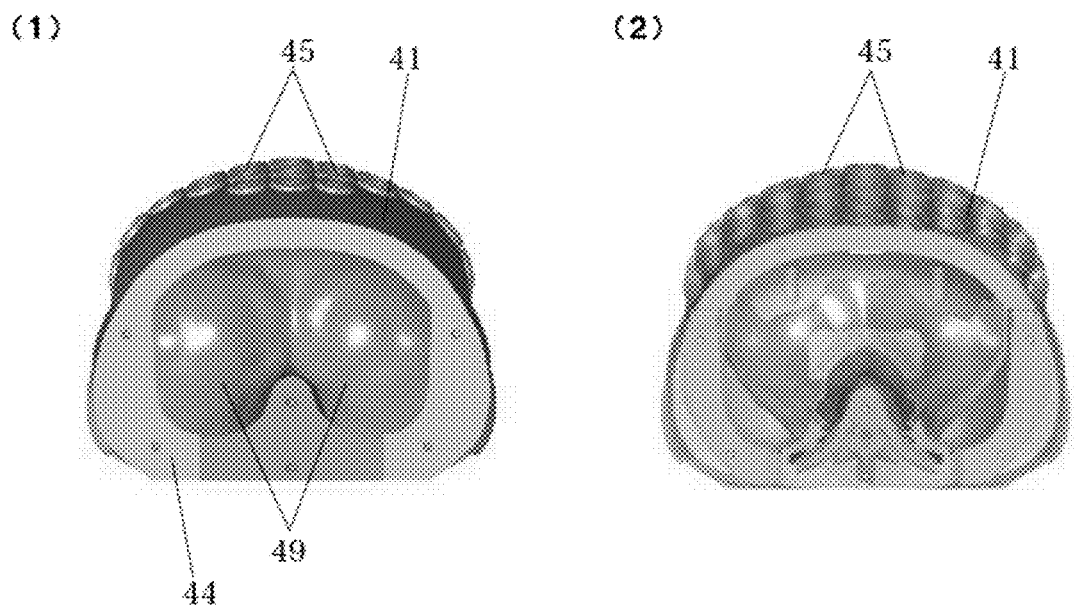
FIG. 23 An explanatory view of the opening the diaphragm side peritoneal cavity simulator according to embodiment 4

FIG. 23 (1) shows a front view of the lid 44 and FIG. 23 (2) shows a status of the peritoneal cavity simulator when the lid 44 is detached. The lid 44 has a portion 49 simulating a diaphragm. The lid is detachable and the biologically textured organ model (not illustrated) is arranged with an exchange to the peritoneal cavity space inside the peritoneal cavity simulator after taking out the lid 44. It is also possible to exchange the whole model gripping portion (not illustrated).

Figure 24:
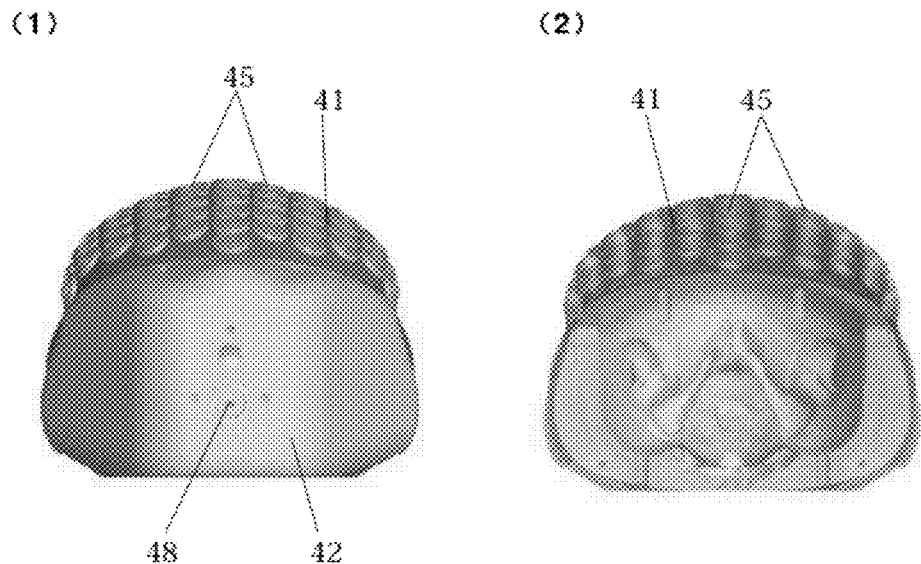
FIG. 24 An explanatory view of the opening the pelvis side peritoneal cavity simulator according to embodiment 4

FIG. 24 (1) shows a front view of the pelvis 42 and FIG. 24 (2) show a status of the peritoneal cavity simulator when the pelvis 42 is detached. A hole 48 for the urine duct is disposed at the center of the pelvis 42, passing through to the peritoneal cavity space. Note that the pelvis 42 is detachable in the same way as the lid 44 and the biological organ texture model (not illustrated) is arranged with an exchange to the peritoneal cavity space inside the peritoneal cavity simulator after taking out the pelvis 42. It is also possible to exchange the whole model gripping portion (not illustrated).

Embodiment 5

Figure 25:
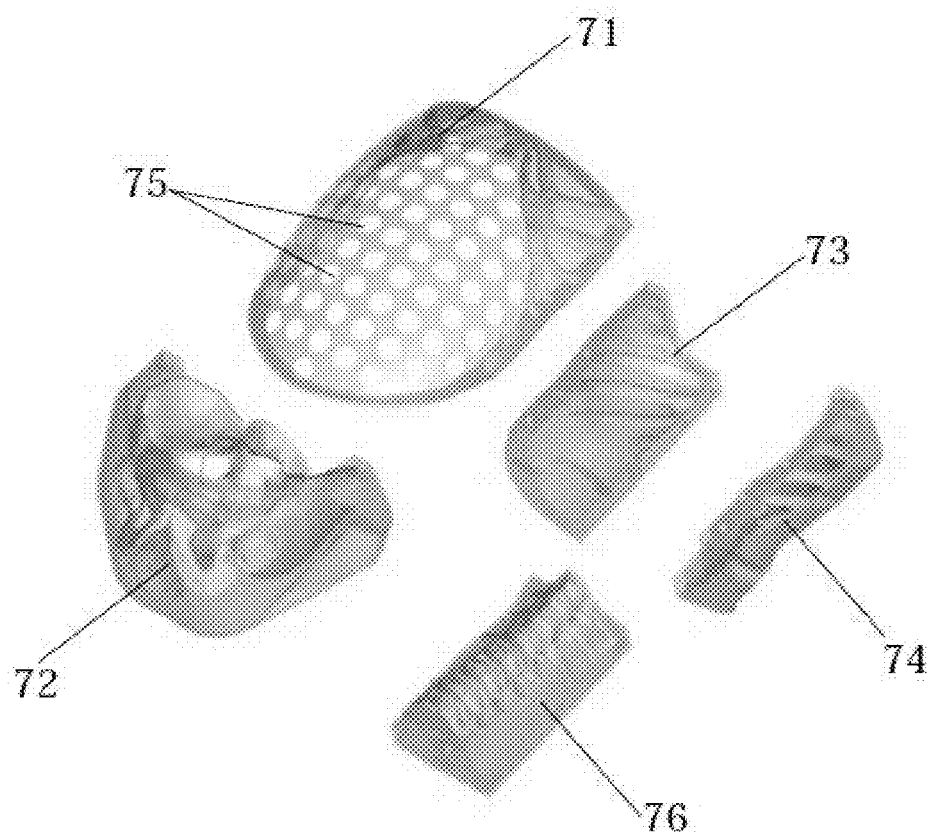
FIG. 25 An exploded view of the peritoneal cavity simulator according to embodiment 5

The peritoneal cavity simulator according to embodiment 5 is explained by referencing the exploded view in FIG. 25.

The peritoneal cavity simulator according to embodiment 5, unlike the disassembly structure of the peritoneal cavity simulator shown in FIG. 18, is configured with a casing member of the abdomen 71, a casing member of the pelvis and a casing member of the back area divided into plurality of members, as shown in FIG. 25. The casing member of the back area consists of a casing member of a pair of the left and right side abdomen areas (73, 74) and a casing member of the backbone 76. Although the number of members increases when decomposed, there is a merit that the storage space becomes compact.

Many port holes 75 are formed at the abdomen area 71 and forceps and surgical instruments can be inserted into the inside of the abdomen space through port holes 75 at an arbitrary position. At each inner surface of the casing member of the pelvis 72, the casing member of a pair of left and right sides (73 and 74) and the casing member of the back bone 76, geometry models of the pelvis, the ribs and the back bones with reality are disposed.

INDUSTRIAL APPLICATION POSSIBILITY

The present invention is useful as a simulator for trainings and learnings of the laparoscopic operations and especially as a device to provide a greater use to train suturing of the urinary bladder model and the urine duct.

EXPLANATION OF SIGNS 1, 40, 60 Peritoneal cavity simulator
2 Casing
3, 3a Cover
4, 48 Hole of urine duct
5, 7 Port member
6, 8, 45, 75 Port hole
10 Urinary bladder model
11 Strip member
12a to 12e hole
13 Hook portion
14 Support portion
15 Engagement portion
20 Urine duct gripping portion
20a Notch portion
21 Urine duct member
30 Forceps handles
31 Forceps
41, 71 Abdomen
42, 72 Pelvis
43, 73, 74 Back area
44 Lid area
46, 76 Back bone
47 Ribs
49 Portion simulating diaphragm
50 Model gripping portion
51 Recession

The invention claimed is:

1. A peritoneal cavity simulator for learning a laparoscopic medical procedure, comprising:
at least one biologically textured organ model;
a first casing defining a simulated peritoneal cavity, a pelvis area, an abdomen area, and a back area having right and left sides;
the abdomen area furnished with a plurality of ports, each port capable of receiving inserted surgical instruments used under a laparoscopic medical procedure;
the pelvis area simulating a human body pelvis shape;
the peritoneal cavity containing a model gripping portion for fixing, mounting or clipping the biologically textured organ model in the peritoneal cavity;
the model gripping portion including a strip member abutting against an inner wall of the casing in the pelvis area, the biologically textured organ model detachable from the model gripping portion;
wherein the biologically textured organ model includes a urinary bladder model having a plurality of holes for suturing and connecting a urine duct, an end portion of the strip member having an engaging portion engageable with the urinary bladder model, the engaging portion having a polygonal shape.

2. A peritoneal cavity simulator as set forth in claim 1, further comprising:
a rod like member being disposed at said pelvis area, said back area, or an inner wall of the casing at said right and left sides, and said biologically textured organ model being fixed or engaged at an end portion of said rod like member.

3. A peritoneal cavity simulator as set forth in claim 1, wherein an image of an actual human peritoneal cavity wall is displayed on an inner wall of the casing, whereby a monitor camera inserted in one of the ports returns a more realistic video image.

4. A peritoneal cavity simulator as set forth in claim 1, wherein:
said biologically textured organ model includes a reproduction of a 3-dimensional structure inside an organ.

5. A peritoneal cavity simulator as set forth in claim 1, wherein the biologically textured organ model has a model size which is changeable by linear expansion.

6. A peritoneal cavity simulator as set forth in claim 1, wherein the biologically textured organ model is furnished with one or more tubes simulating a blood vessel at a model surface or a periphery of the model, the tubes containing a liquid, the tubes and liquid configured for the liquid to flow out of the tube when the tube is cut.

7. A peritoneal cavity simulator as set forth in claim 1, further comprising a second casing which is exchangeable with the first casing and which differs from the first casing in at least one of the following ways: a different number of ports, a different disposition of one or more ports.

8. A peritoneal cavity simulator as set forth in claim 1, wherein:
said engaging portion includes an N (N being equal to or larger than 3) polygonal arrangement of holes, the number of said holes of said urinary bladder model being N and each hole being disposed at a vertex of the N-polygonal arrangement.

9. A peritoneal cavity simulator as set forth in claim 8, further comprising:
a urine duct gripping portion which is insertable into a hole in the first casing.

10. A peritoneal cavity simulator as set forth in claim 1, further comprising:
a urine duct gripping portion which is insertable into a hole in the first casing.

11. A peritoneal cavity simulator for learning a laparoscopic medical procedure, comprising:
at least one biologically textured organ model;
a first casing defining a simulated peritoneal cavity, a pelvis area, an abdomen area, and a back area having right and left sides;

the abdomen area furnished with a plurality of ports, each port capable of receiving inserted surgical instruments used under a laparoscopic medical procedure;

the pelvis area simulating a human body pelvis shape;

the peritoneal cavity containing a model gripping portion for fixing, mounting or clipping the biologically textured organ model in the peritoneal cavity;

the model gripping portion including a strip member abutting against an inner wall of the casing in the pelvis area, the biologically textured organ model detachable from the model gripping portion and removable from the peritoneal cavity;

an inner wall of the casing back area being furnished with protruded parts simulating a spine;

a bottom surface of the model gripping portion having a recess that fits the protruded parts simulating a spine and being held slide free against said protruded parts such that sliding is inhibited or prevented; and an upper surface of the model gripping portion formed with a plate or a recess shaped to mount the biologically textured organ model.

12. A peritoneal cavity simulator as set forth in claim 11, wherein an image of an actual human peritoneal cavity wall is displayed on an inner wall of the casing, whereby a monitor camera inserted in one of the ports returns a more realistic video image.

13. A peritoneal cavity simulator as set forth in claim 11, wherein the biologically textured organ model includes a reproduction of a 3-dimensional structure inside an organ.

14. A peritoneal cavity simulator as set forth in claim 11, wherein the biologically textured organ model has a model size which is changeable by linear expansion.

15. A peritoneal cavity simulator as set forth in claim 11, wherein the biologically textured organ model is furnished with one or more tubes simulating a blood vessel at a model surface or a periphery of the model, the tubes containing a liquid, the tubes and liquid configured for the liquid to flow out of the tube when the tube is cut.

16. A peritoneal cavity simulator as set forth in claim 11, further comprising a second casing which is exchangeable with the first casing and which differs from the first casing in at least one of the following ways: a different number of ports, a different disposition of one or more ports.

* * * * *